March 28, 1950

R. H. WEAKS 2,502,067

POWER LIFT MARKER

Filed Dec. 6, 1946

INVENTOR
ROBERT H. WEAKS

BY
McMorrow, Berman & Davidson
ATTORNEYS

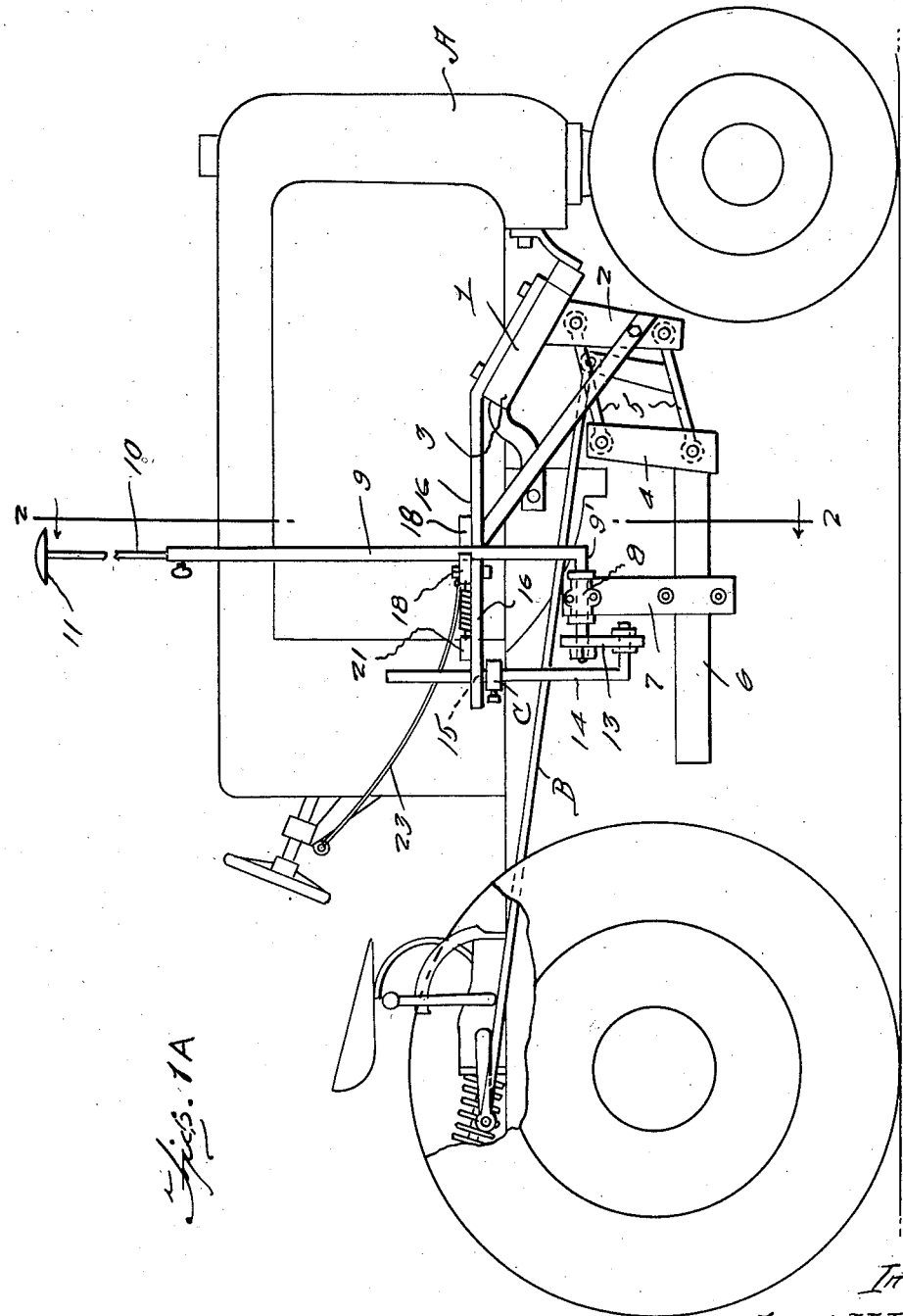

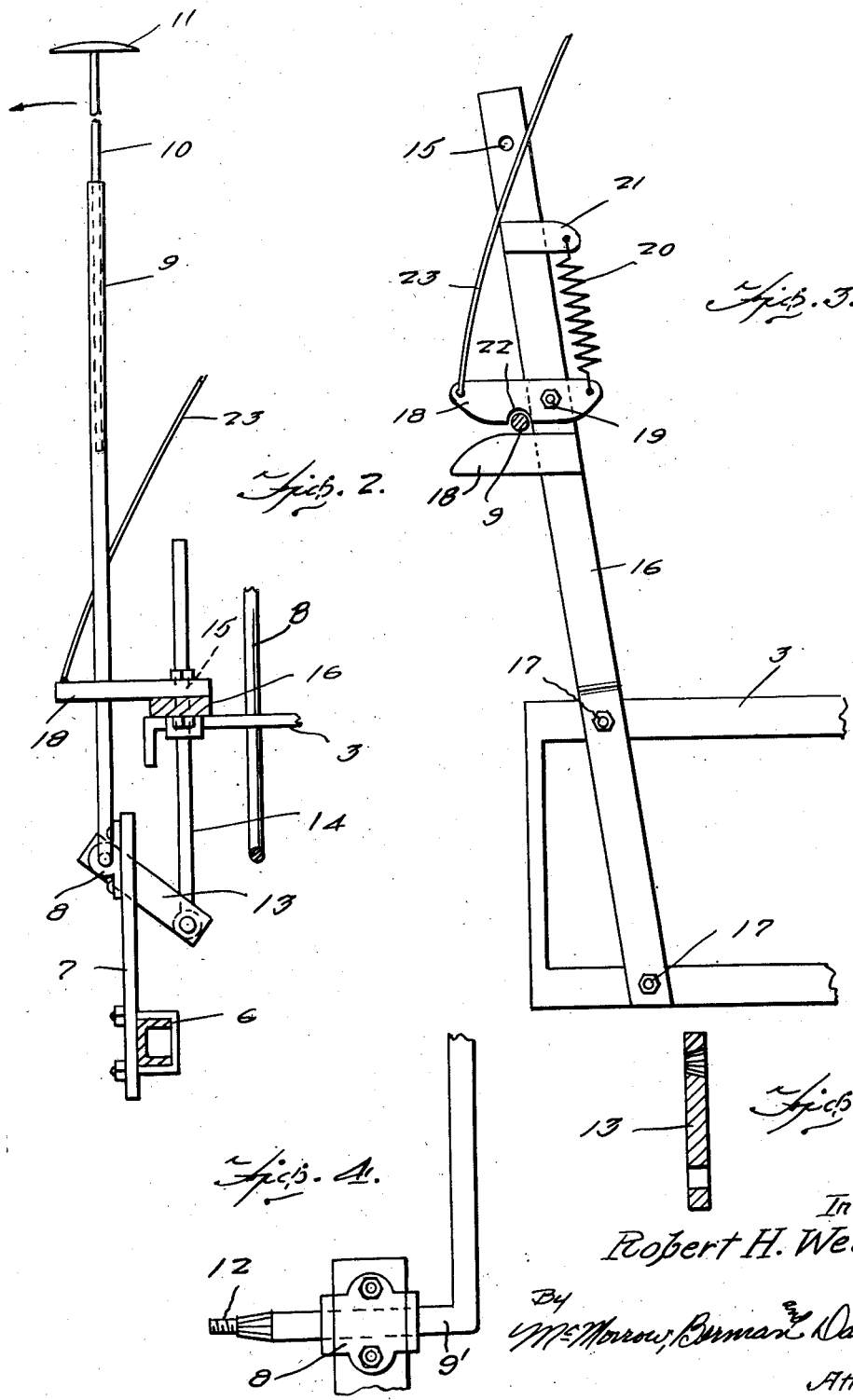

Patented Mar. 28, 1950

2,502,067

UNITED STATES PATENT OFFICE 2,502,067

POWER LIFT MARKER

Robert H. Weaks, Sikeston, Mo.

Application December 6, 1946, Serial No. 714,421

3 Claims. (Cl. 97—230)

This invention relates to a new and improved power lift marker adapted to be mounted on a tractor of which the following is a specification.

The primary object of this invention resides in the provision of a new and improved power lift marker adapted to be mounted on a tractor in conjunction with a planter mounted thereon and operated automatically by the tractor therewith.

Another object of this invention is the provision of a marker which is mounted in conjunction with a planter on a tractor which conventionally marks the next row to be planted while a row is being planted, and a marker which is lifted automatically when the planter is lifted at the end of the row and lowered again, when desired, when the planter is lowered at the commencement of the next row.

Still another object of this invention is the provision of a power lift marker which is easily operated by the operator of the tractor in one easy action, and such a device which is of simple, durable and inexpensive design and which is adapted to a conventional tractor.

Still further improvements and advantages of this invention will readily appear to those skilled in the art when the following description is read in the light of the accompanying drawings in which:

Figure 1A is a side elevation of the lift marker with the planter and its operating connection to the power lift omitted for the sake of clarity.

Fig. 2 is a partial front elevation taken on line 2—2 of Fig. 1.

Fig. 3 is a top plan view of the marker control.

Fig. 4 is a side elevational view of the marker arm mounting.

Fig. 5 is a vertical section of the lever.

Figure 1:
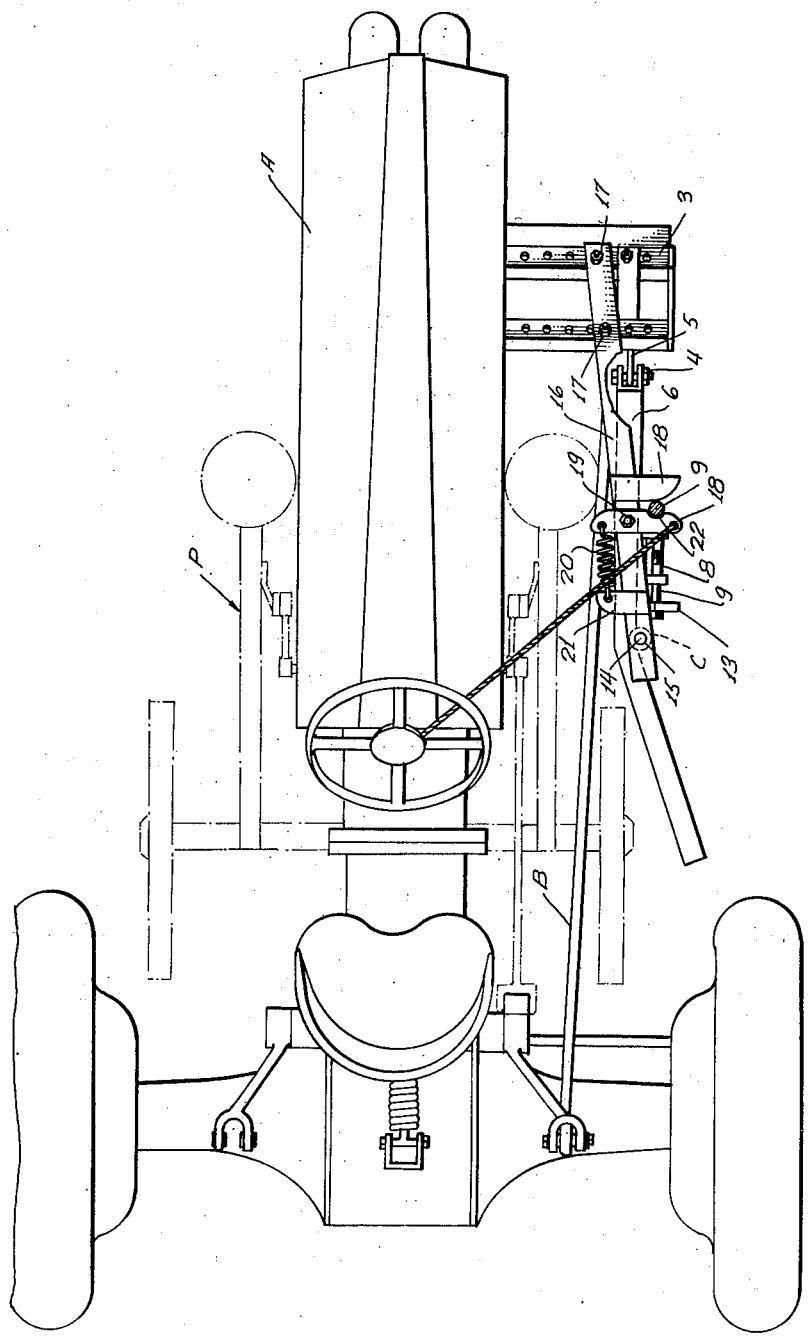
Figure 1 is a plan view of the lift marker of the present invention in association with the planter shown in dotted lines.

Referring now to the accompanying drawings which illustrate the preferred embodiment of this invention and in which like numerals indicate similar parts throughout the drawings A designates the conventional tractor having the usual planter P supported on the tractor frame intermediate the front and rear wheels thereof. Mounted on one or both sides of the tractor frame adjacent to the planter is the power lift marker according to the present invention.

The power lift marker of the present invention comprises a supporting bar 1 which is positioned exteriorly of one of the sides of the tractor frame and is secured to such side of the tractor frame, the bar being slightly behind and above the front wheel of the tractor. A hanger member 2 is secured to the bar 1 in a depending position therefrom. A rectangular frame 3 is secured horizontally rearwardly from the upper end of the bar 1.

A vertically disposed member 4 carrying a horizontal longitudinally extending member 6 is pivoted to links 5, the links being pivotally carried by the hanger member 2.

A lift linkage B is secured to one of the links 5 and extends rearward of the tractor where it is so connected to the gearing of the tractor, and operable from the tractor seat that the member 4 swings relative to the forward pivots of the links 5 to selectively raise and lower the horizontal longitudinally extending member 6 relative to the ground surface.

An upright 7 is secured to the outer edge of the horizontal longitudinally extending member 6, and a bearing 8 is secured with its axis horizontally disposed at the upper end of said upright. A marker arm 9 is mounted for rocking movement about a horizontal longitudinally extending axis between an outwardly and downwardly extending operative position and a vertical transport position on said upright 7, the arm 9 being provided adjacent one end thereof with a rock shaft 9' which is rotatably mounted in the bearing 8 with the other end thereof extending for a predetermined distance where it receives an end of a rod 10 thereon which in turn carries a conventional row disc marker 11 at its other end.

The end of the rock shaft 9' is tapered and is firmly secured to one end of a lever 13 whose other end pivotally or rotatably interconnects with a rod-like member 14 which extends upwardly through an aperture 15 in the outer end of a flat horizontal arm 16, the arm 16 being secured to the rectangular frame 3 by means of removable nuts and bolts 17.

The flat horizontal arm 16 is provided with means for engaging the marker arm 9 to retain it in its vertical transport position, the said means comprising a pair of spaced jaws 18 which are horizontally projected from the flat arm 16, one of said jaws being stationary and the other jaw being pivoted as at 19 for movement to and away from the stationary jaw, the movable jaw being biased to its normal spaced position with respect to the stationary jaw by means of a spring 20. The spring 20 has one end connected to one end of the movable jaw and its other end to a projecting bar 21 which is spaced from the movable jaw and carried by the flat horizontal arm 16. The movable jaw is notched as at 22 adapting it to retain the marker arm 9 in its vertical transport position. A trip rope or line 23 is secured to the other end of said movable jaw 18 to permit the tractor operator to release the marker to allow said marker to move downwardly and outwardly to a marking position with the lowering of the planter.

In operation the planter P is down adjacent the ground while planting a row. At the same time the marker disc and extension are downwardly and outwardly extended marking the ground for the next planting row to be planted.

When the end of the row is reached the tractor operator actuates the power lift by a lever adjacent his seat and the horizontal longitudinally-extending member 6 is lifted through linkage heretofore explained. When the planter is lifted through its connection with its power lift the upright 7 is also vertically raised thus raising the bearing 8 with it. A set collar C upon the rod-like member 14 then contacts the under surface of the flat arm 16 preventing any further vertical movement which then causes the rotation of the rock shaft 9' of the arm 9 within the bearing 8 through the described linkage and causes the marker arm 9 and the disc marker 10 to be pivoted about said bearing to a vertical locked position between said jaws 18 as the upright 7 continues to its vertical limit.

When the planter is again lowered for the next planting row the operator need only pull the trip cord 23 and allow the marker to fall to its marking position.

Thus it may be seen that the necessity of the tractor operator dismounting and manually operating the marking equipment has been eliminated and a new and improved power lift marker provided.

Having thus described and explained the construction and function of this invention and with full belief that changes in size, shape and general characteristics would not constitute departure from the spirit of this invention what I desire to claim is:

1. In combination, a tractor having a horizontal longitudinally extending support member mounted on a tractor for raising and lowering movement, a vertical upright having an end secured to said member, a marker arm mounted on said upright for rocking movement about a horizontal longitudinally extending axis between an outwardly and downwardly extending operative position and a vertical transport position, a lever having an end secured to the marker arm for rocking the same, a flat horizontal arm carried by said tractor, a vertical rod-like member pivotally connected to the other end of said lever and slidable within said flat horizontal arm, stop means on said rod-like member coacting with said flat horizontal arm for limiting sliding movement of the rod-like member, releasable means on said flat horizontal arm for engaging the marker arm to retain the same in its vertical transport position, and actuating linkage operatively connected to said support member and operable from the tractor for selectively raising and lowering the support member, whereby raising said support member causes said rod-like member to slide and said stop means to coact with said flat horizontal arm to limit movement of said rod-like member to cause said lever to rock the marker arm to raise the marker arm to its vertical transport position.

2. In combination, a tractor having a horizontal longitudinally extending support member mounted on the tractor for raising and lowering movement, a vertical upright having an end secured to said member, a marker arm mounted on said upright for rocking movement about a horizontal longitudinally extending axis between an outwardly extending operative position and a vertical transport position, a lever having an end secured to the marker arm for rocking the same, a flat horizontal arm carried by said tractor, a vertical rod-like member pivotally connected to the other end of said lever and slidable within said flat horizontal arm, stop means on said rod-like member coacting with said flat horizontal arm for limiting sliding movement of the rod-like member, and actuating linkage operatively connected to said support member and operable from the tractor for selectively raising and lowering the support member, whereby raising said support member causes said rod-like member to slide and said stop means to coact with said flat horizontal arm to limit movement of said rod-like member to cause said lever to rock the marker arm to raise the marker arm to its vertical transport position.

3. In combination, a tractor having a horizontal longitudinally extending support member mounted on the tractor for raising and lowering movement, a vertical upright having an end secured to said member, a marker arm mounted on said upright for rocking movement about a horizontal longitudinally extending axis between an outwardly and downwardly extending operative position and a vertical transport position, a lever having an end secured to the marker arm for rocking the same, a flat horizontal arm carried by said tractor, a vertical rod-like member pivotally connected to the other end of said lever and slidable within said flat horizontal arm, a stop means embodying a collar positioned on said rod-like member below and spaced from said flat horizontal arm and fixedly secured to said rod-like member for limiting sliding movement of the rod-like member, and actuating linkage operatively connected to said support member and operable from the tractor for selectively raising and lowering the support member, whereby raising said support member causes said rod-like member to slide and said collar to coact with said flat horizontal arm to limit movement of said rod-like member to cause said lever to rock the marker arm to raise the marker arm to its vertical transport position.

ROBERT H. WEAKS.

REFERENCES CITED

The following references are of record in the file of this patent:

UNITED STATES PATENTS

| Number | Name | Date |
|---|---|---|
| 1,078,846 | Gosnay | Nov. 18, 1913 |
| 1,911,218 | White | May 30, 1933 |
| 2,010,110 | Scarlett | Aug. 6, 1935 |
| 2,063,852 | Ray | Dec. 8, 1936 |
| 2,152,212 | Reinkens | Mar. 28, 1939 |
| 2,178,124 | Robinson | Oct. 31, 1939 |